United States Patent [19]

Spak et al.

[11] 4,088,710
[45] May 9, 1978

[54] METHOD OF REDUCING GEL TIME OF POLYESTER THERMOSET RESINS AND PRODUCT THEREOF

[75] Inventors: Anthony J. Spak, Danbury; Arthur J. Yu, Stamford, both of Conn.

[73] Assignee: Stauffer Chemical Company, Westport, Conn.

[21] Appl. No.: 782,593

[22] Filed: Mar. 29, 1977

[51] Int. Cl.² ............................................. C08L 67/06
[52] U.S. Cl. .................................... 260/870; 260/862; 260/867
[58] Field of Search .................... 260/862, 867, 870

[56] References Cited

U.S. PATENT DOCUMENTS

| | | | |
|---|---|---|---|
| 2,479,486 | 8/1949 | Gerhart | 260/45.4 |
| 3,232,893 | 2/1966 | Salgado | 260/2.5 |
| 3,832,268 | 8/1974 | Smith | 161/162 |

FOREIGN PATENT DOCUMENTS 974,214  11/1964  United Kingdom.

*Primary Examiner*—Richard B. Turer
*Attorney, Agent, or Firm*—Richard P. Fennelly

[57] ABSTRACT

The gel time of unsaturated polyester thermosetting resins containing polymerizable vinyl monomers, such a styrene, and a vinylphosphonate flame retardant, such as the bis(hydrocarbyl)vinylphosphonates, which normally retards the gel time of such resins, is reduced by the addition of an effective amount for gel time reduction of maleic anhydride.

20 Claims, No Drawings

METHOD OF REDUCING GEL TIME OF POLYESTER THERMOSET RESINS AND PRODUCT THEREOF

BACKGROUND OF THE INVENTION

1. Field of the Invention

The present invention relates to improvement of the gel time of unsaturated polyester thermosetting resins containing polymerizable vinyl monomers and a vinylphosphonate flame retardant which normally increases the gel time of such resins.

2. Description of the Prior Art

The use of polymerizable vinyl monomers, such as styrene, and certain vinylphosphonate flame retardants, such as the bis (hydrocarbyl)vinylphosphonates, particularly bis(beta chloroethyl)vinylphosphonate, in unsaturated polyesters is known. However, it has been found that the presence of such a vinylphosphonate flame retardant increases the gel time of the resin formulation in which it is incorporated. Increase of the gel time decreases the production rate of these resin formulations and is a commercial disadvantage.

The prior art is contradictory with respect to its teaching as to the effect maleic anhydride has on polyester systems.

U.S. Pat. No. 3,232,893 shows the use of maleic anhydride as a heat providing agent for vapor expansion and a gel time quickener in foamable polyester formulations which may contain conventional flame retardants which do not retard the gel time of such resins U.S. Pat. No. 3,832,268 shows a reinforced plastic structure which is formed from a thermoplastic substrate having bonded thereto a cured polyester and a monomer mixture of a copolymerizable unsaturated carboxylic acid or anhydride, e.g., maleic anhydride, and a different copolymerizable monomer. e.g., styrene. The polyester does not contain any flame retardant additive.

U.S. Pat. No. 2,479,486 shows a styrene and maleic anhydride-containing polyester composition wherein some of the ester portion of the polyester is replaced with an anhydride of tetrahydrophthalic acid derived from maleic anhydride and butadiene. These compositions are said to polymerize quickly at low temperatures. The composition shown in this patent also fails to contain any flame retardant additive.

British Patent No. 974,214 relates to polyesters containing a vinyl monomer, e.g., styrene, a radical forming agent, an accelerator, and either itaconic, citraconic or maleic anhydride. The maleic anhydride is preferred and is said to increase, rather than decrease, the gel time of the resulting compositions. This patent fails to suggest the presence of a flame retardant additive in the polyester composition.

SUMMARY OF THE PRESENT INVENTION

The present invention is a method of reducing the gel time of unsaturated polyester thermosetting resins containing polymerizable vinyl monomers and certain vinylphosphonate flame retardant additives, which normally increase the gel time of such systems, by the incorporation in the resin composition of an effective amount for gel time reduction of maleic anhydride. The invention is also the resulting composition which comprises an unsaturated polyester thermosetting resin, a polymerizable vinyl monomer, a vinylphosphonate flame retardant which normally has the effect of prolonging the gel time of such systems, and an effective amount for gel time reduction of maleic anhydride.

DESCRIPTION OF THE PREFERRED EMBODIMENTS

It is known to form unsaturated polyester compositions containing polymerizable vinyl monomers, such as styrene, and certain flame retardant additives which retard the gel time of such resin systems, such as the bis(hydrocarbyl)vinylphosphonates, particularly bis(-beta chloroethyl)vinylphosphonate. Such known compositions, however, failed to contain maleic anhydride, as contemplated in accordance with the present invention, and have a prolonged gel time as compared to a similar composition not containing such a flame retardant. Efforts to reduce the gel time prolongation caused by the presence of this type of vinylphosphonate flame retardant by the addition of conventional polyester accelerators, such as cobalt naphthanate, have not resulted in the desired reduction in the gel time.

The term "unsaturated polyester thermosetting resin" as used herein is intended to encompass polyesters made by condensing alpha, beta-ethylenically unsaturated dicarboxylic acids or anhydrides or mixtures thereof with a dihydric alcohol or mixtures of dihydric alcohols. This class of resins is well known to persons of ordinary skill in the art. Suitable dicarboxylic acids or anhydrides which may be used in forming the polyester include maleic, fumaric, citraconic acids (or anhydrides) and the like. Examples of dihydric alcohols which can be employed to make the polyesters include ethylene glycol, propylene glycol, dipropylene glycol, diethylene glycol, 1,3-butanediol and the like.

The term "polymerizable vinyl monomer" as used herein is intended to encompass vinyl monomers that are polymerizable with the above-described polyester. Included within this class are styrene, vinyl toluene, diallyl phthalate, triallyl cyanurate, triallyl citrate, diallyl maleate, diallyl fumarate, methyl methacrylate, ethyl acrylate, acrylonitrile, vinyl pyridine, etc.

The term "vinylphosphonate flame retardant" as used herein is meant to encompass those vinylphosphonate flame retardants which, when added to unsaturated polyester/vinyl monomer mixtures, retard the gel time of such compositions. Included within this class of compounds are the bis(hydrocarbyl)vinylphosphonates as well as condensation products formed from such vinylphosphonates.

The bis(hydrocarbyl)vinylphosphonate flame retardants which are intended to be covered include those compounds having the structure:

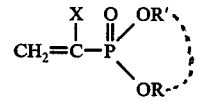

wherein X is selected from the group consisting of hydrogen, halogen, cyano, aryl such as phenyl, $C_1$-$C_{18}$ alkyl and

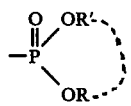

wherein R and R' are hydrocarbyl and substituted hydrocarbyl groups consisting essentially of hydrogen and carbon and containing up to about 18 carbon atoms inclusive with the proviso that R and R' may be the same, different or conjoint, i.e., R and R' may form one single radical.

The use, in this disclosure, of the expression "hydrocarbyl" and "substituted hydrocarbyl groups" refers to the radicals obtained upon the removal of a hydrogen from a hydrocarbon or substituted hydrocarbon group which may be either an aliphatic or aromatic group. These hydrocarbyl groups may be substituted with any non-interfering groups, i.e., with any group which does not interfere with the polymerization of this bis (hydrocarbyl) vinylphosphonate. Such substituent groups include, for example, chloro, bromo, fluoro, nitro, hydroxy, sulfone, ethoxy, methoxy, nitrile, ether, ester and keto groups and the like.

Illustrative of such aliphatic groups as are represented by R and R' are alkyl groups, such as methyl, ethyl, propyl, butyl, pentyl, hexyl, nonyl, pentenyl, and hexenyl groups and all of their respective isomers; cycloalkyl groups, such as cyclopropyl, cyclobutyl, cyclopentyl, cyclohexyl and cyclohexenyl groups and the like; while typical aryl groups represented by R and R' include phenyl, benzyl, phenethyl, tolyl and naphthyl groups and the like.

Representative of the above depicted bis(hydrocarbyl) vinylphosphonates are:
Bis(beta-chloroethyl)vinylphosphonate;
Bis(beta-chloropropyl)vinylphosphonate;
Bis(beta-chloroethyl) 1-methylvinylphosphonate;
Bis(beta-chloroethyl) 1-cyanovinylphosphonate;
Bis(beta-chloroethyl) 1-chlorovinylphosphonate;
Bis(beta-chloroethyl) 1-phenylvinylphosphonate;
Dimethyl vinylphosphonate;
Diethyl vinylphosphonate;
Bis(omega-chlorobutyl)vinylphosphonate;
Di-n-butyl vinylphosphonate;
Di-isobutyl vinylphosphonate;
Bis(2-chloroisopropyl) 1-methylvinylphosphonate;
Diphenyl vinylphosphonate; and
Bis(2,3-dibromopropyl)vinylphosphonate From the above group of bis(hydrocarbyl)vinylphosphonate monomers, it is preferred to employ bis(beta-chloroethyl)vinylphosphonate since the latter monomer is a commercially available material and is lower in cost than any of the other bis (hydrocarbyl)vinylphosphonates.

The condensation products formed from the above described vinylphosphonates are also intended to be covered. Included are the homo- and copolycondensation products of such vinylphosphonates with pentavalent phosphorus esters. Such condensation products are well known and are described in a number of U.S. patents including the following:

1. U.S. Pat. No. 3,641,202 to J. B. Biranowski et al. which disclose condensation products of bis(haloalkyl)-vinylphosphonates. These compounds have the following structure:

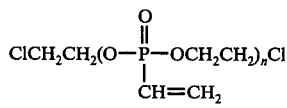

wherein $n$ is a number of at least 2. These compounds are preferably liquids below about 70° C. and are soluble in the polyester. They preferably are compounds wherein $n$ is from about 2 to about 6.

2. U.S. Pat. No. 3,822,327 of E. D. Weil which shows condensation products of bis(2-haloethyl)vinylphosphonates formed by heating the vinylphosphonate at a temperature sufficient to evolve an ethylene dihalide (e.g., 140°–250° C.), for example, by conducting the reaction in the presence of from about 100 ppm to 5%, by weight of the vinylphosphonate, of a basic compound such as an alkali or alkaline earth metal carbonate, bicarbonate or hydroxide. The resulting product will have the following formula:

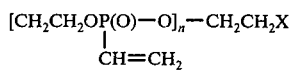

where X is chloro or bromo and $n$ has a value of from about 1.2 to about 10.

3. U.S. Pat. No. 3,855,359 of E. D. Weil which shows copolycondensates of bis(2-haloalkyl)vinylphosphonates. These compositions are prepared by condensing a 2-haloalkyl vinylphosphonate and a pentavalent phosphorus ester of the formula ROP(O)XY where R can be alkyl, alkenyl or haloalkyl and X and Y are independently selected from the group consisting of RO-, alkyl, hydroxyalkyl, alkenyl, aryl, aryloxy, amino, and alkyl or aryl substituted amino groups. Preferred condensation products are formed by condensing bis(beta chloroethyl)vinylphosphonate with $(RO)_2P(O)R'$, where R is alkyl or $HOCH_2CH_2-$ and R' is alkyl.

The basic unsaturated polyester thermosetting resin which the present invention is intended to improve also contains effective amounts for curing of a polyester catalyst, and, if needed, an accelerator for said curing.

The types of catalysts which can be used are well known to persons of ordinary skill in the art. Included are oil soluble catalysts such as the organic and inorganic peroxides, hydroperoxides and azo compounds, such as benzoyl peroxide, methyl ethyl ketone peroxide, cyclohexanone peroxide, hydrogen peroxide, lauroyl peroxide, tertiary butyl perbenzoate, diacetyl peroxide, cumene hydroperoxide, 2-t-butylazo-2-cyanopropane, 1-(t-butylazo)-1-cyanocyclohexane, bis(azoisobutyronitrile), etc., and mixtures thereof.

Suitable accelerators for the curing are also well known and include both the metallic and amine accelerators as well as their mixtures which are well known to the art. Representative metallic promoters include salts of heavy metals, such as cobalt naphthenate, cobalt octoate, manganese octoate, ferric napthenate, cupric napththenate, etc., and mixtures thereof. The amine promoters include dimethyl aniline, diethyl aniline, methyl ethyl aniline, etc., and mixtures thereof. If the various constituents of the total polyester composition of the present invention are expressed in terms of parts by weight per 100 parts of polyester (phr) the following would describe such compositions: polyester: 100 parts by weight; total vinyl monomer or condensation product content: about 50 to about 1000 phr of which the non-phosphorus vinyl monomer is about 70 to about 95 wt. % and the vinylphosphonate flame retardant is about 5 to about 30 wt. %; polyester catalyst: about 0.1 to about 3 phr; and polyester accelerator: about 0 to about 0.5 phr.

The present invention is practiced by incorporating an effective amount of maleic anhydride in the above-described polyester compositions containing the vinylphosphonate flame retardants so as to shorten the gel time retardation caused by the presence of such flame retardants. Generally, the total vinyl monomer/vinylphosphonate/maleic anhydride content will comprise about 50% to about 80%, by weight, of non-phosphorus vinyl monomer, about 5 to about 30%, by weight, of vinylphosphonate flame retardant, and about 5% to about 45% by weight of maleic anhydride, all percentages being based on the combined weight of these three components.

If desired, the vinylphosphonate flame retardant may be sold with a desired amount of maleic anhydride so as to give the needed amount of maleic anhydride in the final polyester composition. If desired the amount of vinylphosphonate flame retardant to maleic anhydride can range from about 1:1 to about 10:1 on a weight basis in such a mixture, e.g., more particularly from about 1:1 to about 4:1.

The present invention is further illustrated by the Examples which follow.

EXAMPLE 1

This Example illustrates the gel time reduction which occurs when maleic anhydride is added to a series of commercially available styrenated unsaturated polyester resins (available from Koppers Co., Inc., Pittsburgh, Pa. as "1010-5"). The gel times of each of the formulations given below was measured on a "Randolph Gel Timer — Model 100" available from Shyodu Precision Instrument Co., New York, N.Y. To measure the gel time the catalyzed resin was placed in the apparatus and a low torque synchronous motor rotated a specially shaped stirrer in the resin mixture. As gelation occurred, drag exceeded the torque of the motor causing stalling. The time was then read to the nearest tenth of a minute. Longer gel times are undesirable. The methyl ethyl ketone peroxide catalyst contained in each formulation was added after all other reagents were mixed and just before measurement of the gel time. Whenever a gel time is repeated it is meant to indicate the results obtained for the respective repeats of the gel time measurement.

| Formulation No. 1 (Control): | | |
|---|---|---|
| Ingredients | Amount (in gm.) | Gel Time (in. min.) |
| Polyester | 90 | |
| Bis (beta chloroethyl) vinylphosphonate | 10 | >1219 |
| Methyl ethyl ketone peroxide | 1.25 | |

This formulation at 1219 minutes had become very viscous but had not gelled.

| Formulation No. 2 (Control): | | |
|---|---|---|
| Ingredients | Amount (in gm.) | Gel Time (in min.) |
| Polyester | 80 | |
| Bis (beta chloroethyl) vinylphosphonate | 10 | |
| Styrene | 10 | |
| Methyl ethyl ketone peroxide | 1.25 | >1279 |

At the time noted the mixture was a viscous fluid but had not gelled.

| Formulation No. 3 (Control): | | |
|---|---|---|
| Ingredients | Amount (in gm.) | Gel Time (in min.) |
| Polyester | 90 | |
| Bis (beta chloroethyl) vinylphosphonate | 10 | |
| Methyl ethyl ketone peroxide | 1.25 | >1335.4 |

This formulation became more viscous but did not gel at the time noted above.

| Formulation No. 4 | | |
|---|---|---|
| Ingredients | Amount (in gm.) | Gel Time (in min.) |
| Polyester | 85 | |
| Bis (beta chloroethyl) vinylphosphonate | 10 | 213.5 |
| Maleic Anhydride | 5 | 167.7 |
| Methyl ethyl ketone peroxide | 1.25 | 149.3 |

The resin formulation cured to a hard, clear transparent mass with a tacky surface by each of the times given above.

| Formulation No. 5: | | |
|---|---|---|
| Ingredients | Amount (in gm.) | Gel Time (in min.) |
| Polyester | 80 | |
| Bis (beta chloroethyl) vinylphosphonate | 10 | |
| Maleic anhydride | 10 | 69.6 |
| Methyl ethyl ketone peroxide | 1.25 | |

This formulation cured to a hard blue green transparent mass which did not have a tacky surface. The peak temperature that was noted during the curing was 160° C., and some liberation of smoke was noted.

It has been found that a formulation of 100 gm. of the polyester and 1.25 gm. of the methyl ethyly ketone peroxide not containing the vinylphosphonate flame retardant gelled in 55.3 min. to a hard light pink mass.

EXAMPLE 2

This Example is presented to illustrate that such other ethylenically unsaturated alpha, beta-dicarboxylic acids as fumaric acid, its corresponding esters, e.g., dibutyl fumarate, and dibutyl maleate do not give the desired degree of gel time reduction. The Table set forth below gives the six different samples which were tested. All samples contained 0.2 gm. of cobalt naphthenate, a known polyester accelerator, and 1.0 gm. of methyl ethyl ketone peroxide catalyst in addition to those given below. The polyester that was used is the same one that was used in Example 1.

| | Ingredients | Amounts (in gm.) | Gel Time (in min.) |
|---|---|---|---|
| 1. | Polyester | 100 | 12.0 and 12.2 |
| 2. | Polyester | 90 | |
|  | Bis (beta chloroethyl) vinylphosphonate | 10 | 22.8 |
| 3. | Polyester | 80 | |
|  | (Bis (beta chloroethyl) vinylphosphonate | 10 | |
|  | Maleic anhydride | 10 | 7.5 |
| 4. | Polyester | 80 | |
|  | Bis (beta chloroethyl) vinylphosphonate | 10 | |

-continued

| | Ingredients | Amounts (in gm.) | Gel Time (in min.) |
|---|---|---|---|
| | Fumaric acid | 10 | 27.8 |
| 5. | Polyester | 80 | |
| | Bis (beta chloroethyl) vinylphosphonate | 10 | |
| | Dibutyl maleate | 10 | 28.4 |
| 6. | Polyester | 80 | |
| | Bis (beta chloroethyl) vinylphosphonate | 10 | |
| | Dibutyl fumarate | 10 | 25.7 |

The data show that the gel time of the polyester with-out the presence of the vinylphosphonate flame retardant is about 12 minutes (Sample No. 1). When vinylphosphonate is added the gel time is substantially prolonged (Sample No. 2). Maleic anhydride substantially decreases the retardation caused by the addition of the vinylphosphonate (Sample No. 3). Fumaric acid, dibutyl maleate and dibutyl fumarate do not decrease the gel time of the system (Sample Nos. 4-6).

EXAMPLE 3

This Example further illustrates the effect of bis(beta chloroethyl)vinylphosphonate (herein below abbreviated as "Bis Beta") and maleic anhydride (herein below abbreviated as "MA") on the commercially available styrenated polyester unsaturated resin used in Example 1. In addition to these two additives (when present) the polyester also contained 2%, by weight, of the polyester, of methyl ethyl ketone peroxide catalyst. The gel times were determined as described in Example 1. All percentages are by weight based on the weight of polyester.

mability resistance without seriaously altering the other physical properties of the resin.

EXAMPLE 4

This Example illustrates the improvement in gel time noted by addition of maleic anhydride (hereinafter abbreviated "MA") to styrenated unsaturated polyester resins containing a copolycondensed vinylphosphonate flame retardant (hereinafter abbreviated "FR") made in accordance with U.S. Pat. No. 3,855,359 available commercially as Fyrol ® 76 from Stauffer Chemical Company, Specialty Chemical Division, Westport, Connecticut. In Samples 1-3 listed below the polyester resin is the same one that was used in Example 1. Samples 4-6 use a slightly more reactive polyester resin ("Hetron 24370" from Hooker Chemical Corporation, Niagara Falls, N.Y.) Each sample contained 2%, by weight of the polyester, of methyl ethyl ketone peroxide catalyst. The gel times were measured in accordance with the procedure described in Example 1. All percentages are on a weight basis based on the weight of the polyester resin.

| Sample No. | FR (%) | MA (%) | Gel Time (in min.) |
|---|---|---|---|
| 1 | 0 | 0 | 19 |
| 2 | 10 | 0 | 200 |
| 3 | 10 | 5 | 20.5 |
| 4 | 0 | 0 | 9.7 |
| 5 | 10 | 0 | 33.7 |
| 6 | 10 | 4 | 12 |

EXAMPLE 5

TABLE

| Sample No. | Bis-Beta (%) | MA (%) | Gel Time (in min.) | $H_2O$ Absorption[1] (%) | Wt. Chge.[2] (%) | LOI[3] | Flex. Str.[4] $\times 10^9$ | Flex. Stiffness[5] $\times 10^{10}$ |
|---|---|---|---|---|---|---|---|---|
| 1 | 0 | 0 | 55.3 | +0.67 | −2.2 | 20.4 | 2.1 | 9.4 |
| 2 | 10 | 0 | >1200 | — | — | — | — | — |
| 3 | 15 | 10 | 30.3 | +0.3 | −4.8 | 27.5 | 2.9 | 12.6 |
| 4 | 20 | 10 | 47.7 | +0.41 | −6.5 | 30.9 | 2.7 | 11.1 |

[1] measured as the percentage of water absorbed by the sample in 24 hours at room temperature, based on the weight of the dry sample. Water absorption or the moisture content of the material is intimately related to such properties as electrical insulation resistance, dielectric loss, mechanical strength, appearance and the dimensions of the sample. A lower value is generally desired for most applications.

[2] measured as the percentage weight loss of a sample after immersion in acetone at room temperature for 24 hours.

[3] Limiting Oxygen Index. This test is conducted by means of the procedure described by Fenimore and Martin in the November 1966 issue of Modern Plastics. It directly relates flame retardancy to a measurement of the minimum percentage concentration of oxygen in an oxygen:nitrogen mixture which permits the sample to burn. A higher LOI is indicative of a higher degree of flame retardancy and is more desirable for some applications.

[4] measured in dynes/cm.[2]. The flexural strength of the sample is the maximum stress in the outer fibers of a specimen at the moment of crack or break. It is obtained by ASTM D 790-1966.

[5] measured in dynes/cm.[2]. It is a measure of the relative stiffness of plastic materials and is obtained by means of ASTM D 790.

The above data indicate that use of a bis(beta-chloroethyl)vinylphosphonate/maleic anhydride mixture in a styrenated unsaturated polyester resin increases flammability resistance without seriaously altering the other physical properties of the resin.

This Example illustrates the smoke data, hardness, flexural strength, flexural modulus of a series of polyester resins (such as described in Example 1) containing two vinylphosphonate flame retardants and a triethylphosphate flame retardant. The Table which follows sets forth the data which was generated.

| Sample No. | ATH[1] (phr) | NBS Smoke Chamber[2] Optical Den. | % Burned | Hardness[3] | Flexural[4] Strength | Flexural[5] Modulus | LOI[6] |
|---|---|---|---|---|---|---|---|
| 1 | 0 | 672,717 | 27.8% | 94 | $1.3 \times 10^9$ | $5.6 \times 10^{10}$ | 21.8 |
|   | 50 | 386,532 | 32.7% | 94 | $1.3 \times 10^9$ | $8.2 \times 10^{10}$ | 24.7 |
| 2 | 0 | 755,648 | 28.2% | 90 | $1.8 \times 10^9$ | $6.9 \times 10^{10}$ | 26.0 |
|   | 50 | 475,548 | 28.0% | 87 | $1.1 \times 10^9$ | $5.0 \times 10^{10}$ | 30.0 |
| 3 | 0 | — | — | — | — | — | — |
|   | 50 | 432,401 | 27.2% | 82 | $1.3 \times 10^9$ | $5.6 \times 10^{10}$ | 30.0 |

—Continued

| Sample No. | ATH[1] (phr) | NBS Smoke Chamber[2] Optical Den. | % Burned | Hardness[3] | Flexural[4] Strength | Flexural[5] Modulus | LOI[6] |
|---|---|---|---|---|---|---|---|
| 4 | 50 | 377,375 | 25.8% | 87 | $1.1 \times 10^9$ | $3.8 \times 10^{10}$ | 31.5 |

Sample No. 1 is a control of the polyester resin and 2 wt. % of methyl ethyl ketone peroxide catalyst. No vinyl-phosphonate or phosphate flame retardant is present.
Sample No. 2 contains in addition to Sample No. 1's constituents a bis (beta chloroethyl) vinylphosphonate/maleic anhydride mixture. The vinylphosphonate flame retardant is present at 10 parts by weight per 100 parts by weight of polyester and the maleic anhydride at 4 parts by weight.
Sample No. 3 is the same as Sample No. 2 with the exception of a condensed vinylphosphonate flame retardant formed in accordance with U.S. Pat. No. 3,855,359 to E. Weil. This flame retardant is available as Fyrol® 76 from Stauffer Chemical Company.
Sample No. 4 is presented for comparison purposes and is similar to Sample No. 1 with the exception that 10 parts by weight of triethylphosphonate is added.
[1]ATH stands for aluminum trihydrate which was added to some of the polyester resins to absorb some of the heat evolved during the exothermic curing reaction. The values given are parts by weight ATH per 100 parts by weight of resin.
[2]The smoke chamber results were obtained in a commercial smoke density chamber modeled after one developed at the National Bureau of Standards by the Fire Research Group (See D. Gross, J. J. Loftus and A. F. Robertson, ASTM Special Technical Publication 422, pages 166-204 (1969). This chamber contains a radiant heater producing 2.5 W/cm.$^2$ of heat at the surface of a 7.62 cm. × 7.62 cm. sample, a propane-air pilot burner and a vertical beam
light with a photomultiplier tube detector and microphotometer to record the attenuation of light by smoke developing in the chamber. During smoke testing, the chamber is sealed to enclose the combustion products and smoke. The optical density values are dimensionless values and are directly proportional to the amount of smoke generated by the sample. The "% burned" represents the weight percentage of the sample consumed by the fire.
[3]Hardness values were determined by the Rockwell Hardness test (ASTM D 785-65 [1970]).
[4]Given in units of dynes/cm.$^2$.
[5]Given in units of dynes/cm.$^2$.
[6]Limiting Oxygen Index.

The above Examples are presented to illustrate certain preferred embodiments of the present invention and should not be construed in a limiting sense. The scope of protection that is desired is set forth in the claims which follow.

What is claimed:

1. In a thermosetting resin composition comprising an unsaturated polyester thermosetting resin, a polymerizable vinyl monomer, a vinylphosphonate flame retardant, and a polyester catalyst wherein the improvement comprises an effective amount of maleic anhydride for gel time reduction.

2. A composition as claimed in claim 1 wherein the polymerizable vinyl monomer is selected from the group consisting of styrene, vinyl toluene, diallyl phthalate, triallyl cyanurate, triallyl citrate, diallyl maleate, diallyl fumarate, methyl methacrylate, acrylonitrile, vinyl pyridine and ethyl acrylate.

3. A composition as claimed in claim 1 wherein the polymerizable vinyl monomer is styrene.

4. A composition as claimed in claim 1 wherein the vinylphosphonate is a bis(hydrocarbyl)vinylphosphonate.

5. A composition as claimed in claim 1 wherein the vinylphosphonate is bis(beta chloroethyl)vinylphosphonate.

6. A composition as claimed in claim 1 wherein the vinylphosphonate is a condensation product of a bis(hydrocarbyl)vinylphosphonate.

7. A composition as claimed in claim 1 wherein the amount of maleic anhydride is from about 5% to about 45%, by weight, of the content of maleic anhydride, vinyl monomer and vinylphosphonate flame retardant.

8. A composition as claimed in claim 7 wherein the polymerizable vinyl monomer is styrene and the vinylphosphonate is bis(beta chloroethyl)vinylphosphonate.

9. A composition consisting essentially of a vinylphosphonate flame retardant and maleic anhydride adapted to be used in forming the composition of claim 1.

10. A composition as claimed in claim 9 wherein the weight ratio of vinylphosphonate to maleic anhydride ranges from about 1:1 to about 10:1.

11. A composition as claimed in claim 10 wherein the weight ratio ranges from about 1:1 to about 4:1.

12. A composition as claimed in claim 9 wherein the vinylphosphonate is bis(beta chloroethyl)vinylphosphonate.

13. In a process for improving the gel time of a thermosetting resin composition which comprises an unsaturated polyester thermosetting resin, a polymerizable vinyl monomer, a vinylphosphonate flame retardant, and a polyester catalyst, the improvement in said process comprising incorporating in the polyester composition an effective amount of maleic anhydride for gel time reduction.

14. A process as claimed in claim 13 wherein the polymerizable vinyl monomer is selected from the group consisting of styrene, vinyl toluene, diallyl phthalate, triallyl cyanurate, triallyl citrate, diallyl maleate, diallyl fumarate, methyl methacrylate, acrylonitrile, vinyl pyridine and ethyl acrylate.

15. A composition as claimed in claim 13 wherein the polymerizable vinyl monomer is styrene.

16. A composition as claimed in claim 13 wherein the vinylphosphonate is a bis(hydrocarbyl)vinylphosphonate.

17. A process as claimed in claim 13 wherein the vinylphosphonate is bis(beta chloroethyl)vinylphosphonate.

18. A process as claimed in claim 13 wherein the vinylphosphonate is a condensation product of a bis(hydrocarbyl)vinylphosphonate.

19. A process as claimed in claim 13 wherein the amount of maleic anhydride which is incorporated is from about 5% to about 45%, by weight of the content of maleic anhydride, vinyl monomer and vinylphosphonate flame retardant.

20. A composition as claimed in claim 19 wherein the polymerizable vinyl copolymer is styrene and the vinylphosphonate is bis(beta chloroethyl)vinylphosphonate.

* * * * *